United States Patent

Shibata

[15] 3,683,249
[45] Aug. 8, 1972

[54] ELECTRIC MACHINE ARRANGEMENT COMBINING ELECTROMAGNETIC COUPLING WITH ELECTRIC ROTATING MACHINE

[72] Inventor: Fukuo Shibata, 13 Tokiwa-cho, Nishinomiya, Hyogo-Prefecture Japan

[22] Filed: July 9, 1970

[21] Appl. No.: 53,413

[30] Foreign Application Priority Data

Sept. 27, 1969 Japan ..................44/77266
Jan. 1, 1970 Japan ..................45/202

[52] U.S. Cl. ............318/205, 290/30, 318/200, 322/29
[51] Int. Cl. ............................................H02p 7/36
[58] Field of Search ........290/30; 318/197, 199, 200, 318/205; 322/29

[56] References Cited

UNITED STATES PATENTS

| | | | |
|---|---|---|---|
| 912,144 | 2/1909 | Mavor | 318/205 |
| 1,983,896 | 12/1934 | Böttscher | 318/205 |
| 3,165,635 | 1/1965 | Moss et al. | 322/29 X |
| 3,441,822 | 4/1969 | Shibata | 318/197 |

*Primary Examiner*—Gene Z. Rubinson

[57] ABSTRACT

When an electromagnetic coupling is connected mechanically with an electric rotating machine having a stator, for instance a synchronous motor, a cage rotor type or wound rotor type induction motor etc., and the said electromagnetic coupling is connected electrically with the said electric rotating machine through a phase sequence change over switching device, further the electromagnetic coupling combined mechanically with the rotor of the electric rotating machine drives a load, and the other rotor of the electromagnetic coupling is driven by a driving machine, the electric machine arrangement has such advantages as shown by (1) obtaining power transmitting devices with operation similar to reduction gears which transmit outputs of other driving machines to loads; (2) possibility of driving one rotor of electromagnetic coupling in direction opposite to the rotation of the other rotor; and so forth. If the mechanical combination between the rotor of the electromagnetic coupling and the rotor of the electric rotating machine is made by using a rotor in common for the electromagnetic coupling and for the electric rotating machine, the electric machine arrangement becomes compact.

7 Claims, 14 Drawing Figures

INVENTOR
Fukuo Shibata

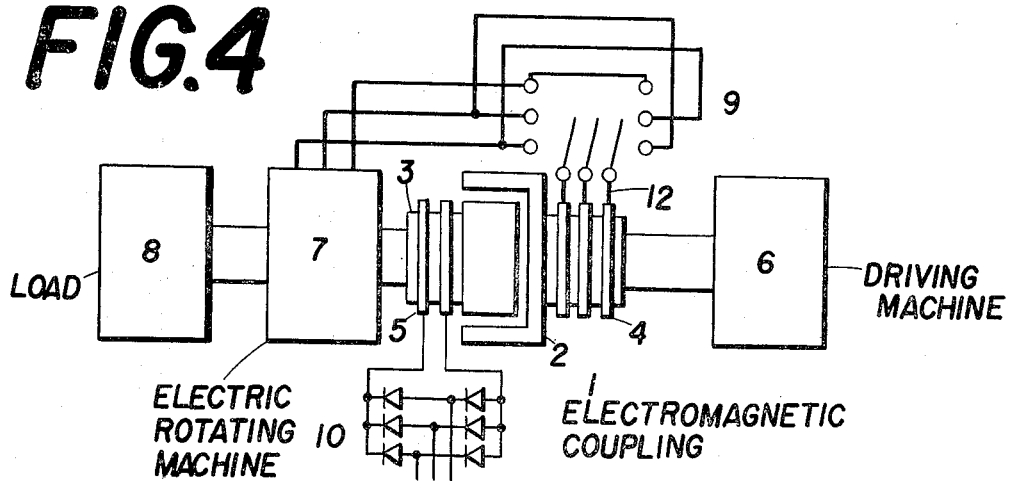
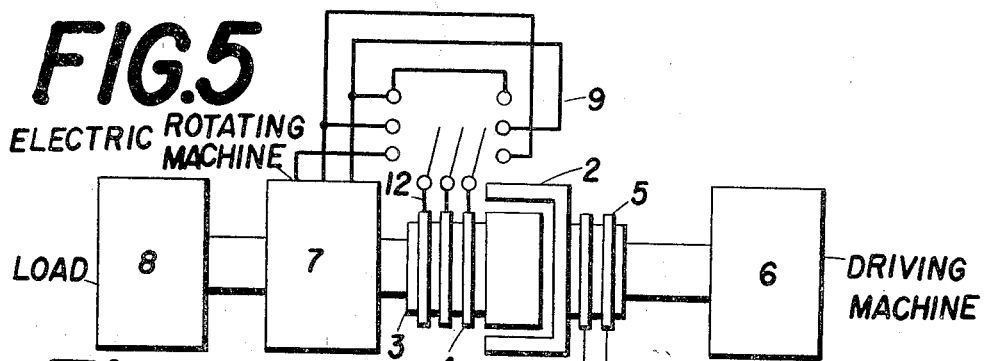
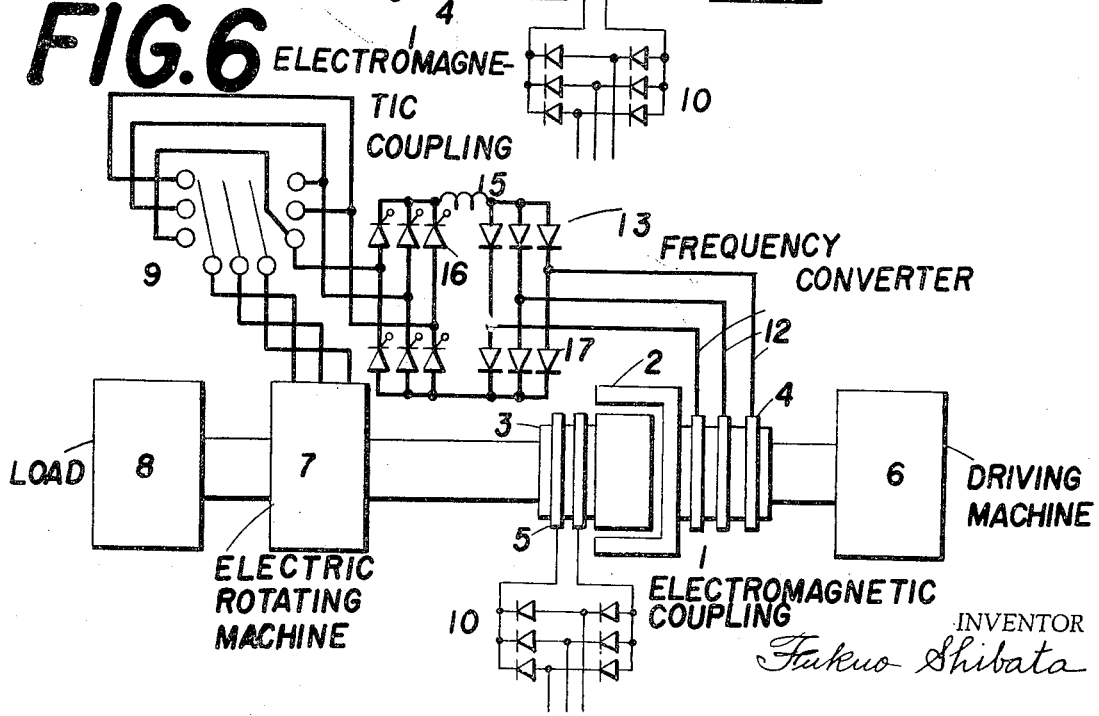

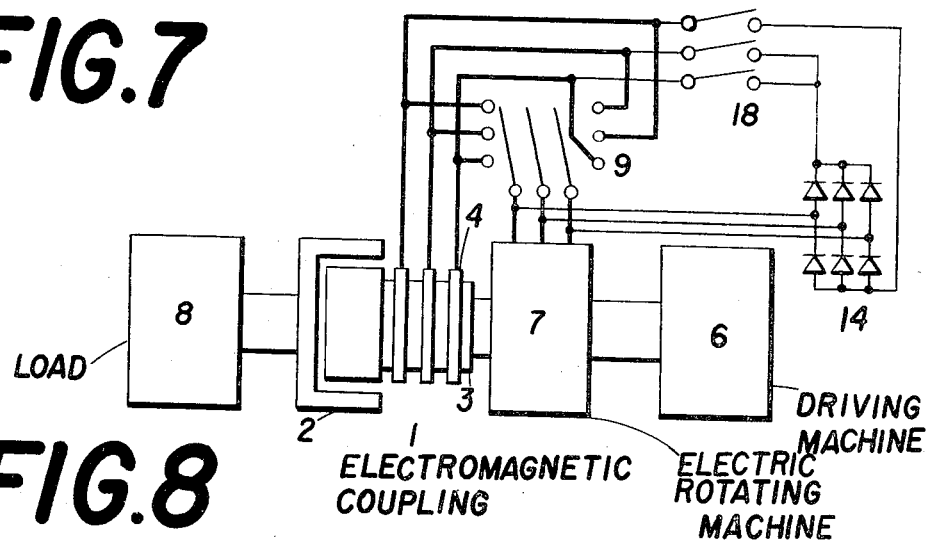
FIG.7
FIG.8
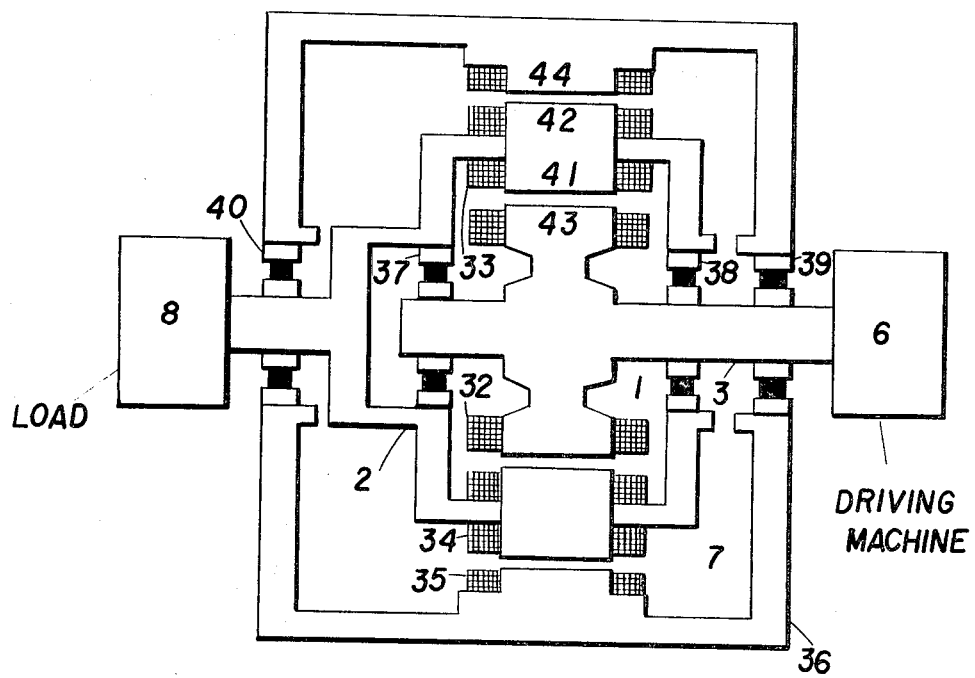
INVENTOR
Fukuo Shibata

INVENTOR
Fukuo Shibata

INVENTOR
Fukuo Shibata 3,683,249

ELECTRIC MACHINE ARRANGEMENT COMBINING ELECTROMAGNETIC COUPLING WITH ELECTRIC ROTATING MACHINE

BACKGROUND OF THE INVENTION

1. Field of the Invention

This invention is used in fields in which it is necessary to transmit an output of a prime mover such as a diesel engine to a load such as a propeller of a ship, a wheel of a car, a fan, pump, etc. Of course, a steam turbine, a water wheel, an electric motor, a gas turbine, etc. other than the said diesel engine can also be used as the said prime mover.

2. Description of the Prior Art

In some prior arrangements in which outputs of prime movers are transmitted to loads, gears are used for addition or reduction of speeds. In general, a gear itself control neither the ratio of addition nor reduction of the speed, nor direction of rotation of a load. In other words, when only a gear is inserted between a prime mover and a load, the speed of the load cannot be controlled or changed by the gear itself, and the direction of the rotation of the load cannot be changed in the direction of the rotation of the prime mover is kept constant.

SUMMARY OF THE INVENTION

It is primary object of the invention to provide an arrangement transmitting an output of a prime mover or a driving machine to a load in which the load speed can be controlled easily by the operation of a device provided in the arrangement itself.

Another object of the invention is to provide an arrangement transmitting an output of a prime mover or a driving machine to a load in which the direction of the rotation of the load can be changed whilst keeping the direction of the rotation of the prime mover constant.

An additional object of this invention is to provide an arrangement combining and transmitting a plurality of prime mover outputs to a load in which the rotation of the load can be changed whilst keeping the direction of the rotation of the prime movers constant.

A further object of this invention is to provide a control system affording wide speed ranges for an arrangement transmitting an output of a prime mover or a driving machine to a load which shall be very simple and efficient in operation and which may be readily and economically manufactured and installed.

A still further object of this invention is to make it possible to construct the said arrangements compactly.

A still more further object of this invention is to make it possible to reduce considerably a space of an engine room of a vessel whilst keeping a total output capacity of combined engines large.

Other objects of this invention will in part be obvious and in part appear hereinafter.

Accordingly, this invention is disclosed in the embodiments thereof shown in the accompanying drawings and comprises the features of construction, combination of elements and arrangement of parts which will be indicated in the appended claims.

BRIEF DESCRIPTION OF THE DRAWING

Referring to the drawing:

FIG. 1, FIG. 2, FIG. 3, FIG. 4, FIG. 5 and FIG. 7, illustrate diagrammatically embodiments of this invention.

FIG. 6 illustrates one embodiment of construction used as a part of an arrangement of this invention.

FIG. 8 illustrates diagrammatically a part of an embodiment of this invention.

DESCRIPTION OF THE PREFERRED EMBODIMENTS

Figure 1:
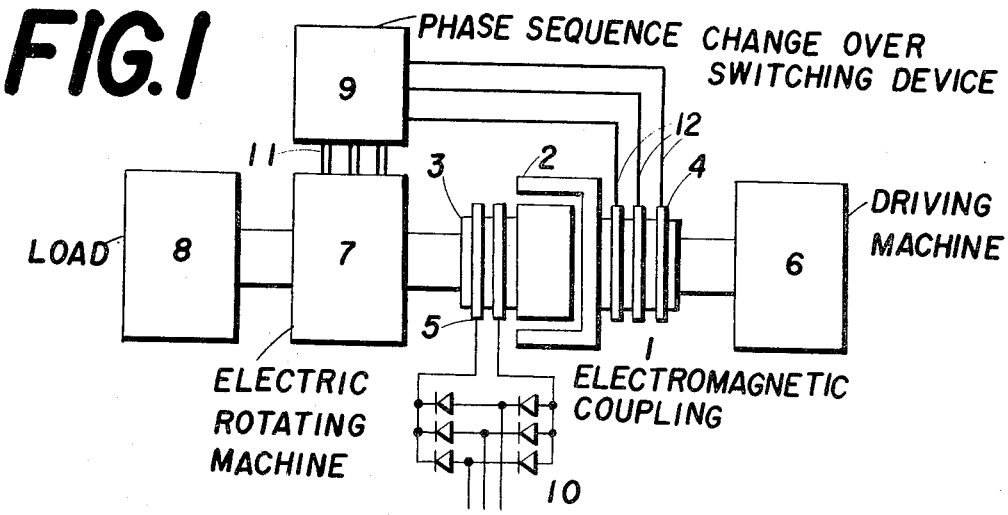

As shown in FIG. 1 and FIG. 6 an electric machine arrangement of this invention has a combination of: an electromagnetic coupling 1 having two rotors 2, 3 which rotate with respect to each other and one of which is provided with an armature winding; an electric rotating machine 7 having a stator, a rotor and an armature winding, in which alternating current flows mechanical combination of one of the said two rotors 2, 3 of the said electromagnetic coupling 1 with the said rotor of the said electric rotating machine 7; and electric connection 11, 12 between the said armature winding of the said electromagnetic coupling 1 and the said armature winding of the said electric rotating machine 7 through a phase sequence change over switching device 9; wherein the rotor 2 of the electromagnetic coupling 1 combined mechanically with the rotor of the electric rotating machine 7 drives a load 8, and the other rotor 3 of the electromagnetic coupling 1 is driven by a driving machine 6, further, the said mechanical combination between the rotor of the electromagnetic coupling 1 and the rotor of the electric rotating machine 7 is made by an arrangement of a rotor 2 which is provided with material of a magnetic circuit for the electromagnetic coupling in its inner face 41 and is provided with material of a magnetic circuit for the electric rotating machine 7 in its outer face 42 and which rotates in a space between the stator 36 of the electric rotating machine 7 and the other rotor 3 of the electromagnetic coupling 1. Examples of the said electric rotating machine 7 are a synchronous machine, a cage rotor induction machine, a wound rotor induction machine etc. In FIG. 1, a rotor 2 is provided with an armature winding and sliprings 4; and a rotor 3 is provided with a field winding and sliprings 5 which is electrically connected with rectifiers 10 in order to be supplied with direct current. In FIG. 1, the rotor 3 of the electromagnetic coupling 1 combined mechanically with the rotor of the electric rotating machine 7 drive a load 8, and the other rotor 2 of the electromagnetic coupling 1 is driven by a driving machine 6. A propeller of a ship, a wheel of a car, a fan, a pump etc. are examples of the said load 8. Prime movers such as a diesel engine, a steam turbine, a water wheel, an electric motor, a gas turbine etc. are examples of the said driving machine 6. In FIG. 1, it can be so arranged that the direction of rotation of the rotor of the electric rotating machine 7 is opposite to the direction of rotation of the rotor 2 of the electromagnetic coupling 1 driven by the driving machine 6 through the electric connection of the phase sequence change over switching device 9.

If the revolutions per minute of rotors 2 and 3 of the electromagnetic coupling 1 are respectively $N_2$ and $N_3$, and $N_2 > N_3$, we can obtain $$N_2 \mp N_3 = N_o \quad (1)$$

where $N_o$ is revolutions per minute of the rotor 2 in relation to the rotor 3.

When the direction of the rotation of the rotor 3 is same as that of the rotor 2, the sign attached before $N_3$ in Equation (1) is negative, and when the direction of the rotation of the rotor 3 is opposite to that of the rotor 2, the sign attached before $N_3$ in equation (1) is positive. Whether the direction of the rotation of the rotor 3 may be same as that of the rotor 2 or not, the electromagnetic coupling acts not only as a coupling but also as a generator.

In such a case, an electric machine arrangement combining an electromagnetic coupling with an electric rotating machine 7 can transmit an output of a driving machine 6 to a load 8, and further, the direction of the rotation of the load 8 can be changed whilst keeping the direction of the rotation of the driving machine 6 constant. It is very important when the driving machine is a prime mover such as a diesel engine, a steam turbine, a gas turbine etc., and the load 8 is a propeller of a ship.

If numbers of poles of the electromagnetic coupling 1 and the electric rotating machine 7 are respectively $p_1$ and $p_7$, and frequency of alternating current flowing in the circuit between the electric rotating machine 7 and the electromagnetic coupling 1 is $f$, we can obtain $$N_o = 120 f/p_1 \quad (2)$$
$$N_3 = 120 f/p_7 \quad (3)$$

Therefore, $$N_o/N_3 = p_7/p_1 \quad (4)$$

From Equations (1) and (4), $$N_2 \mp N_3 = N_3 \cdot p_7/p_1$$
$$\text{So, } N_2 = (p_7/p_1 \mp 1) N_3 \quad (5)$$

If $p_7 > p_1$, the direction of rotation of the rotor of the electric rotating machine 7 can be opposite to the direction of rotation of the rotor of the electromagnetic coupling 1. If the electric rotating machine 7 has pole change windings, and the electric connection 11 is made between the armature winding of the electromagnetic coupling 1 and the pole change armature windings of the electric rotating machine 7 through the phase sequence change over switching device as shown in FIG. 8, the revolutions per minute of the load 8 when the direction of the rotor of the electric rotating machine 7 is opposite to that of the driving machine 6 can be decided to be favorable to the load 7 regardless of the revolutions per minute of the load 8 when the direction of the rotor of the electric rotating machine 7 is same as that of the driving machine 6. Similar effect of operation of this invention as the above can be obtained when the electromagnetic coupling 1 has pole change windings, and the electric connection is made between the pole change armature windings of the electromagnetic coupling 1 and the armature winding of the electric rotating machine 7 through the phase sequence change over switching device 9 as shown in FIG. 7.

As is understood from the above explanation, the construction of this invention made by the combination of the electromagnetic coupling 1 and the electric rotating machine 7 can be operated as a device similar to a reduction gear. The speed of the revolving shaft of the input rotor of the electromagnetic coupling 1 is reduced to the speed of the rotor shaft of the electromagnetic coupling 1. The construction of the prior electromagnetic method such as the U.S. Pat. No. 912,144 can never be operated as a device similar to a reduction gear. The operation of this invention similar to a reduction gear can be improved by a phase sequence change over switching device inserted in the circuit between the armature winding of the electromagnetic coupling 1 and the armature winding of the electric rotating machine 7. In other words, the direction of the rotation of the load 8 can be changed whilst keeping the direction of the rotation of the prime mover or the driving machine 6 constant. The operation similar to a reduction gear can be done also when the direction of the rotation of the load 8 is opposite to the direction of the rotation of the driving machine 6 in this invention. Such operation cannot be done by the prior method such as the U.S. Pat. No. 912,144.

The pole change is important when the direction or rotation of the rotor of the electric rotating machine 7 is turned to the opposite side to the direction of rotation of the rotor of the electromagnetic coupling 1, as is explained before. For instance, if the revolution per minute of the rotor 2 of the electromagnetic coupling 1 or of the driving machine 6 is 400 rpm., numbers of poles of the electromagnetic coupling 1 and the electric rotating machine 7 are respectively 4 and 8, the revolution per minute of the rotor 3 of the electromagnetic coupling 1 or of the load 8 becomes 133.3 rpm. by the Equation (5) $N_2 = (p_7/p_1 + 1) N_3$, when the direction of rotation of the load 8 is same as that of the driving machine 6. In this case, if the numbers of poles of the electromagnetic coupling 1 and the electric rotating machine 7 are either respectively 4 and 16 or respectively 2 and 8, when the direction of rotation of the load 8 is opposite to that of the driving machine 6, the revolution per minute of the rotor 3 of the electromagnetic coupling 1 or of the load 8 becomes 133.3 rpm. by the Equation (5) $N_2 = (p_7/p_1 - 1) N_3$. Thus, the revolution per minute of the load 8 when the direction of rotation of the load 8 is opposite to that of the driving machine 6 can be same as that when the direction of rotation of the load 8 is same as that of the driving machine 6 by using pole changing either of the electric rotating machine 7 or of the electromagnetic coupling 1. Therefore, "pole change" is important in this invention.

In this invention, the mechanical combination can be made between the rotor 2 of the electromagnetic coupling 1 and the rotor of the electric rotating machine 7 by an arrangement of a rotor which is provided with material of a magnetic circuit for the electromagnetic coupling 1 in its inner face 41 and is provided with material of a magnetic circuit for the electric rotating machine 7 in its outer face 42 and which rotates in a space between the stator 36 of the electric rotating machine 7 and the other rotor 3 of the electromagnetic coupling 1, as shown in FIG. 6.

In FIG. 6, an inner face 44 of the magnetic circuit of the electric rotating machine 7 and an outer face 43 of the magnetic circuit of the rotor 3 of the electromagnetic coupling 1 face each other through the faces 41 and 42 of the rotor 2 of the electromagnetic coupling 1. The electric winding 32 of the rotor 3, the electric winding 33 of the rotor 2 of the electromagnetic coupling 1, the electric rotor winding 34 of the electric rotating machine 7 and the electric stator winding 35 of the electric rotating machine 7 are shown in FIG. 6. These electromagnetic coupling 1 and electric rotating machine 7 are covered by a case 36. Symbols 37, 38, 39, and 40 show bearings.

Figure 2:
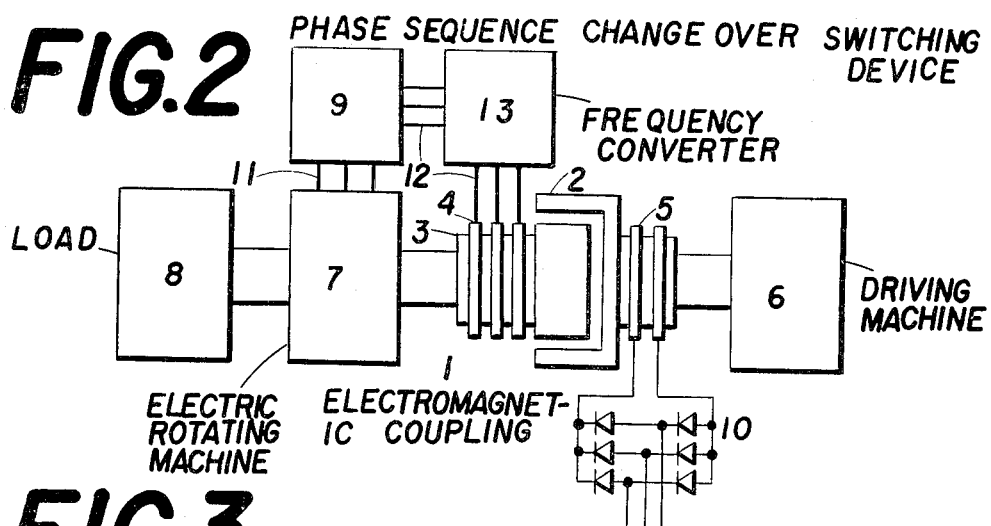

In FIG. 2, a frequency converter 13 is connected electrically between the armature winding of the electromagnetic coupling 1 and the armature winding of the electric rotating machine 7. FIG. 5 shows an embodiment of FIG. 2. In FIG. 5, the frequency converter 13 consists of diode type rectifier 17, a reactor 15 and controlled rectifiers 16. FIG. 7 shows that the armature winding of the electromagnetic coupling 1 can be connected electrically with an armature winding of an alternating current (A.C.) generator 22 driven by another driving machine 23. In FIG. 7, diesels 23, 24, 25 are shown as examples of driving machines. Electromagnetic couplings 1 and 31 provided with pole change windings are shown, and symbols 26, 27 are change over switch for pole changing of electromagnetic couplings in FIG. 7. Electromagnetic couplings 1 and 31 are connected electrically in parallel with the A.C. generator 20. In this case, two loads 8, 28, two electric rotating machines 7, 30 and two change over switching device 9, 29 are respectively shown in FIG. 7.

Figure 13:
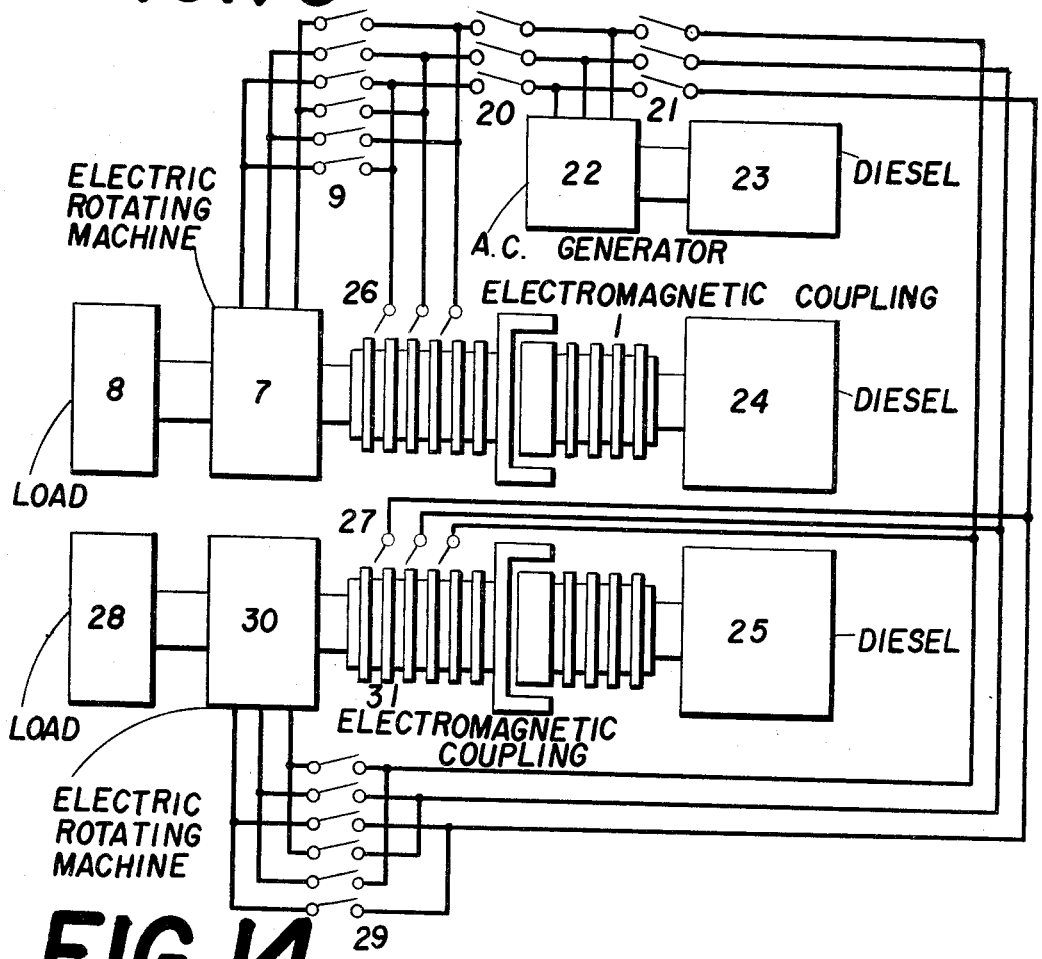
Figure 14:
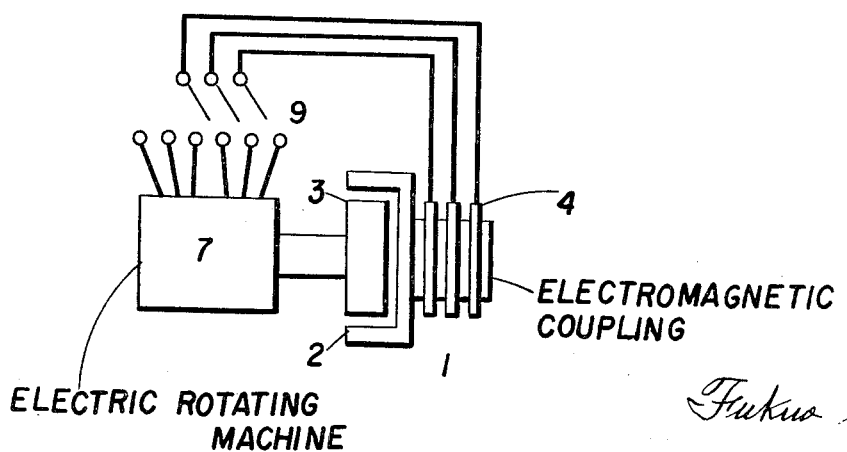

In FIG. 13, the direction of rotation of the rotor of the electric rotating machine 7 can be same as the direction of rotation of the rotor of the electromagnetic coupling 1 driven by the driving machine 24 by connecting electrically the armature winding of the electric rotating machine 7 with one of the pole change armature windings of the electromagnetic coupling 1 through the phase sequence change over switching device 9, and the direction of rotation of the rotor of the electric rotating machine 7 can be opposite to the direction of rotation of the rotor of the electromagnetic coupling 1 driven by the driving machine 24 by connecting electrically the armature winding of the electric rotating machine 7 with the other of said pole change armature windings of the electromagnetic coupling 1 through the phase sequence change over switching device 9. Symbols 20 and 21 are switches.

In FIG. 1 or FIG. 8, it can be so arranged that the direction of rotation of the rotor of the electric rotating machine 7 is same as the direction of rotation of the rotor of the electromagnetic coupling 1 driven by the driving machine 6 by connecting electrically the armature winding of the electromagnetic coupling 1 with one of the pole change armature windings of the electric rotating machine 7 through the phase sequence change over switching device 9, and the direction of rotation of the rotor of the electric rotating machine 7 is opposite to the direction of rotation of the rotor of the electromagnetic coupling 1 driven by the driving machine 6 by connecting electrically the armature winding of the electromagnetic coupling 1 with the other of the said pole change armature windings of the electric rotating machine 7 through the phase sequence changeover switching device 9.

Figure 3:
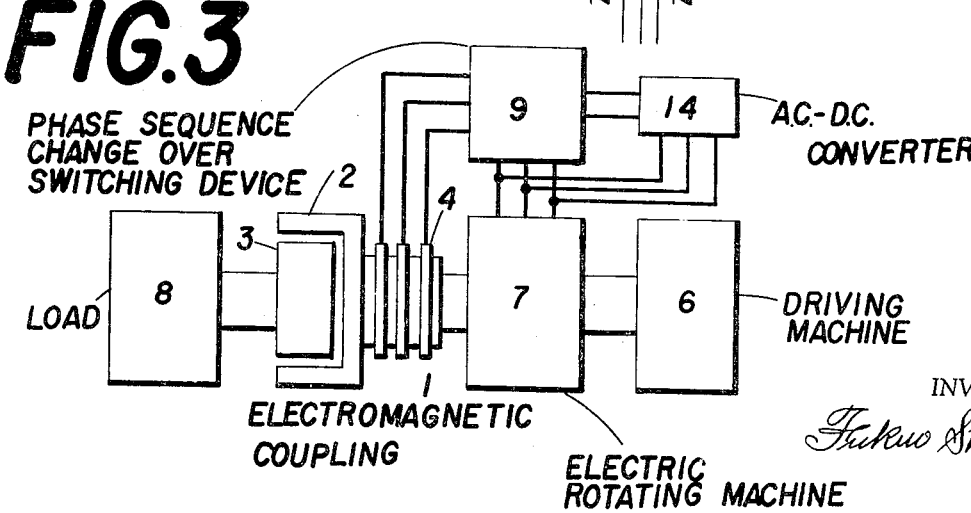
Figure 9:
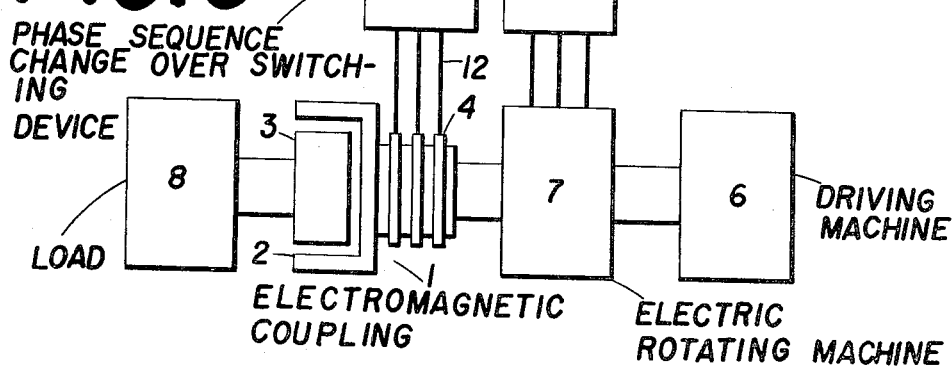
Figure 10:
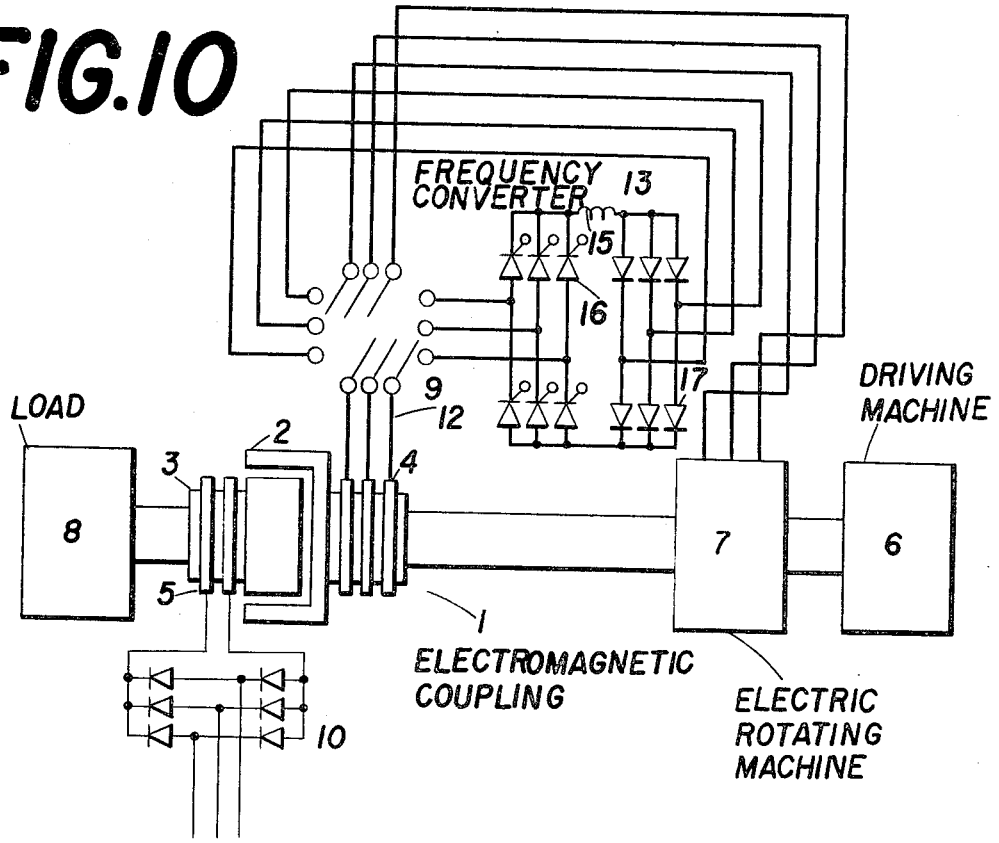
Figure 11:
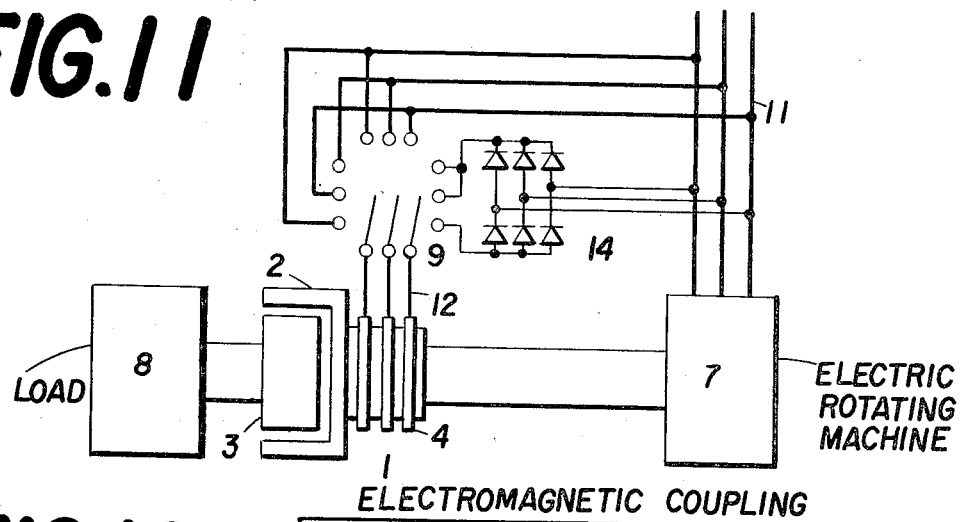
Figure 12:
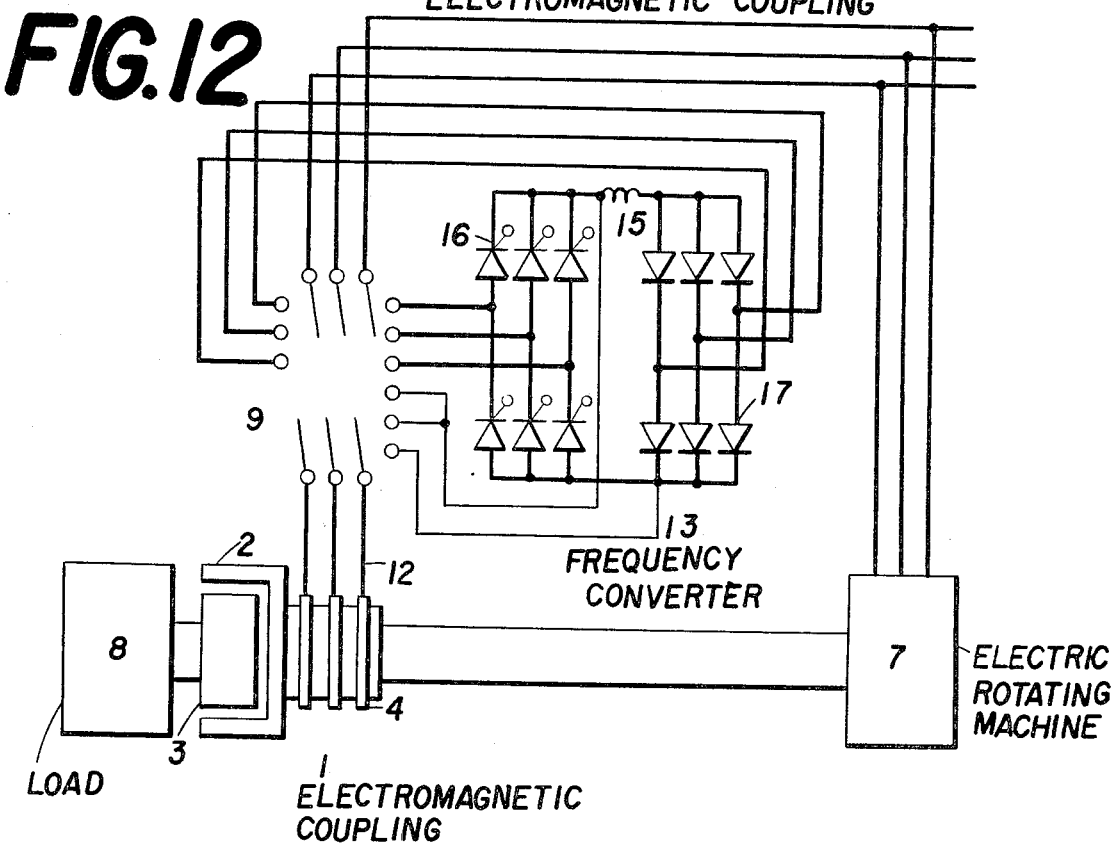

FIG. 3 and FIG. 4 are shown in order to illustrate the phase sequence change over switching device 9 of FIG. 9 of FIG. 1. Further, it is also shown in FIG. 3 and FIG. 4 that the rotor provided with an armature winding of the electromagnetic coupling may be coupled mechanically by either the driving machine 6 or the electric rotating machine 7.

What I claim is:

1. An electric machine arrangement which has a combination of: an electromagnetic coupling having two rotors which rotate with respect to each other and one of which is provided with an armature winding; an electric rotating machine having a stator, a rotor and an armature winding in which alternating current flows; mechanical combination of one of the said two rotors of the said electromagnetic coupling with the said rotor of the said electric rotating machine; and electric connection between the said armature winding of the said electromagnetic coupling and the said armature winding of the said electric rotating machine through a phase sequence change over switching device; wherein the rotor of the electromagnetic coupling combined mechanically with the rotor of the electric rotating machine drives a load, and the other rotor of the electromagnetic coupling is driven by a driving machine, further, the said mechanical combination between the rotor of the electromagnetic coupling and the rotor of the electric rotating machine is made by an arrangement of a rotor which is provided with material of a magnetic circuit for the electromagnetic coupling in its inner face and is provided with material of a magnetic circuit for the electric rotating machine in its outer face and which rotates in a space between the stator of the electric rotating machine and the other rotor of the electromagnetic coupling.

2. An electric machine arrangement as claimed in claim 1, wherein the electric rotating machine has pole change windings, and the electric connection is made between the armature winding of the electromagnetic coupling and the pole change armature windings of the electric rotating machine through the phase sequence change over switching device.

3. An electric machine arrangement as claimed in claim 1, wherein the electromagnetic coupling has pole change windings, and the electric connection is made between the pole change armature windings of the electromagnetic coupling and the armature winding of the electric rotating machine through the phase sequence change over switching device.

4. An electric machine arrangement as claimed in claim 1, wherein a frequency converter is connected electrically between the armature winding of the electromagnetic coupling and the armature winding of the electric rotating machine.

5. An electric machine arrangement as claimed in claim 1, wherein the armature winding of the electromagnetic coupling can be connected electrically with an armature winding of an alternating current generator driven by another driving machine.

6. An electric machine arrangement as claimed in claim 2, wherein the direction of rotation of the rotor of the electric rotating machine can be same as the direction of rotation of the rotor of the electromagnetic coupling driven by the driving machine by connecting electrically the armature winding of the electromagnetic coupling with one of the pole change armature windings of the electric rotating machine through the phase sequence change over switching device, and the direction of rotation of the rotor of the electric rotating machine can be opposite to the direction of rotation of the rotor of the electromagnetic coupling driven by the driving machine by connecting electrically the armature winding of the electromagnetic coupling with the other of the said pole change armature windings of the electric rotating machine through the phase sequence change over switching device.

7. An electric machine arrangement as claimed in claim 3, wherein the direction of rotation of the rotor of the electric rotating machine can be same as the direction of rotation of the rotor of the electromagnetic coupling driven by the driving machine by connecting electrically the armature winding of the electric rotating machine with one of the pole change armature windings of the electromagnetic coupling through the phase sequence change over switching device, and the direction of rotation of the rotor of the electric rotating machine can be opposite to the direction of rotation of the rotor of the electromagnetic coupling driven by the driving machine by connecting electrically the armature winding of the electric rotating machine with the other of the said pole change armature windings of the electromagnetic coupling through the phase sequence change over switching device.

* * * * *